No. 809,971. PATENTED JAN. 16, 1906.
J. F. McCARTNEY.
PLUMBER'S TRAP.
APPLICATION FILED JAN. 2, 1904.
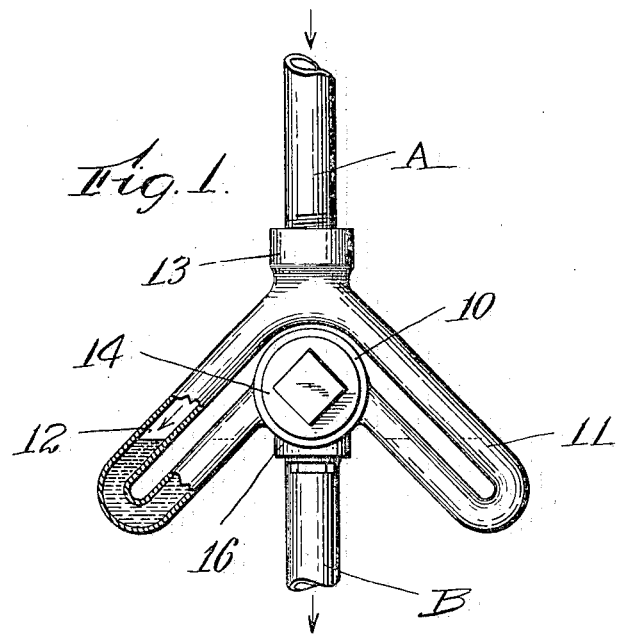
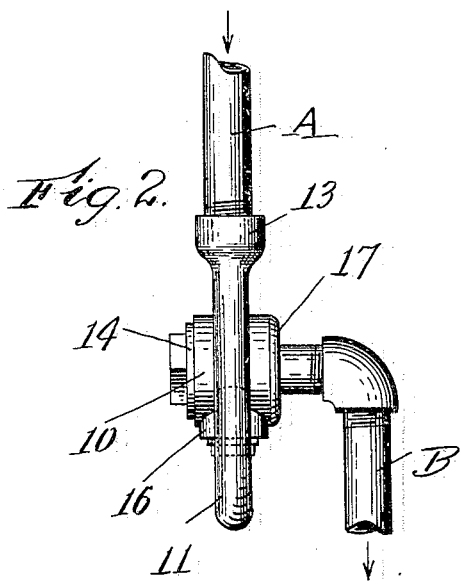
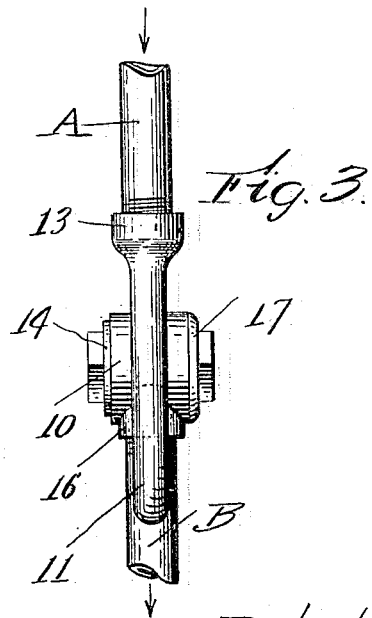
Witnesses
C. F. Wesson.
M. E. Regan.
Inventor:
J. F. McCartney
By his Attorneys
Southgate & Southgate

UNITED STATES PATENT OFFICE.

JOHN F. McCARTNEY, OF WORCESTER, MASSACHUSETTS.

PLUMBER'S TRAP.

No. 809,971.      Specification of Letters Patent.      Patented Jan. 16, 1906.

Application filed January 2, 1904. Serial No. 187,412.

*To all whom it may concern:*

Be it known that I, JOHN F. McCARTNEY, a citizen of the United States, residing at Worcester, in the county of Worcester and State of Massachusetts, have invented a new and useful Plumber's Trap, of which the following is a specification.

This invention relates to that class of traps which are employed in the waste-pipes of plumbing-fixtures—such, for example, as washbasins, sinks, &c.

The object of this invention is to provide a simple, efficient, and symmetrical construction which is especially adapted for use in open plumbing or in situations where the traps are exposed to view.

To this end this invention consists of the plumber's trap as an article of manufacture and of the combinations of parts therewith, as hereinafter described, and more particularly pointed out in the claims at the end of this specification.

In the accompanying drawings, Figure 1 is a side view, partly broken away, of a plumber's trap constructed according to this invention. Fig. 2 is a side view of the same, and Fig. 3 is a similar view showing the outlet-pipe opening directly from the bottom of the barrel.

A plumber's trap constructed according to this invention consists of a body portion or barrel with two return-bend passages which connect with a common inlet.

The barrel or body portion of the trap is preferably cylindrical. The outlet of the trap is usually from the rear end of the barrel or body portion thereof, although, if desired, the outlet-pipe may open directly from the bottom of the barrel or body portion.

At the front of the barrel I preferably provide a clean-out plug which may be taken out when it is desired to clean out or inspect the inside of the trap.

The trap as a whole is preferably formed of a single integral casting. The return-bend passages are symmetrical with respect to the center of the trap, so that the construction presents a well-balanced and pleasing appearance.

In the practical use of the trap each of the return-bends provides a water seal, and I regard the dividing of the flow in a trap constructed according to this invention as a feature of advantage, as it makes a construction which cannot be readily drained by siphonic action and at the same time by bringing the two streams together in the barrel or body portion of the trap the impact or momentum of one stream will tend to counteract the impact or momentum of the other stream, producing an efficient scouring in the body portion or barrel of the trap, which will tend to prevent the same from clogging or filling up.

A still further advantage in the construction arises from the location of the clean-out plug in such position that it can be removed to give free access to the inside of the trap without exhausting or spilling any of the water therefrom.

Referring to the accompanying drawings for a detail description of a trap constructed according to this invention, A designates the inlet-pipe leading to the trap, and B designates the outlet-pipe leading therefrom.

The trap itself consists of a body portion or barrel 10, which is preferably cylindrical. Connected with the barrel 10 of the trap are return-bend passages 11 and 12, which unite in a common inlet-boss 13. At the front of the barrel 10 of the trap I provide a clean-out plug or cap 14, which is preferably threaded in place, and the rear end of the barrel 10 is closed by a ground-joint plug 17, to which the outlet-pipe may be connected. The bottom of the barrel 10 of the trap is provided with a boss or enlargement 16, and the outlet-pipe B may be directly tapped into this bottom boss 16 when an outlet is desired directly from the bottom of the barrel 10 of the trap.

In the practical manufacture of traps constructed according to this invention each trap is preferably made from a single piece or casting, and by the use of traps made according to my invention I have provided a symmetrical attractive construction in which the water seal cannot be readily broken, while at the same time the trap is self-scouring, so that it is not liable to become clogged by dirt or refuse and ready access may be had to the interior of the trap through the clean-out plug. Furthermore, traps manufactured according to my invention are adapted for use in a great variety of situations on account of the many different ways in which the same may be connected to other fixtures.

I am aware that numerous changes may be made in the relative shapes and proportions of traps made according to my invention by those who are skilled in the art, and I do not wish, therefore, to be limited to the construction I have herein shown and described; but What I do claim, and desire to secure by Letters Patent of the United States, is—

1. As an article of manufacture, a plumber's trap comprising a cylindrical barrel with inclined return-bend passages opening into the sides of the barrel directly opposite each other, both of said return-bends lying in a single vertical plane, whereby the water entering the barrel through said bends will form two directly-opposed streams producing a scouring or cleaning action in the barrel.

2. As an article of manufacture, a plumber's trap consisting of a central horizontal barrel, inclined return-bend passages opening into the sides of the barrel directly opposite each other, and both of said return-bends being in one vertical plane, whereby the water entering the barrel through the return-bends will form two opposing streams producing a scouring action inside the barrel, and each of said return-bends being located entirely at one side of the vertical plane through the axis of the barrel, a connection for an outlet-pipe at one end of the barrel, and a clean-out plug at the other end of the barrel.

In testimony whereof I have hereunto set my hand in the presence of two subscribing witnesses.

JOHN F. McCARTNEY.

Witnesses:
 PHILIP W. SOUTHGATE,
 LOUIS W. SOUTHGATE.